Sept. 4, 1934.   H. B. WARREN   1,972,545
FINISHING PANEL
Filed Sept. 9, 1932
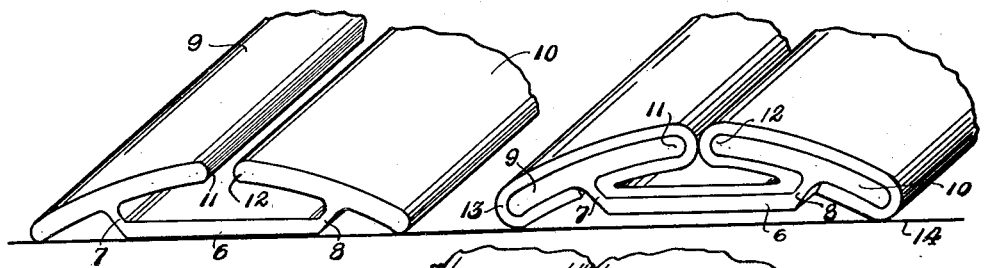
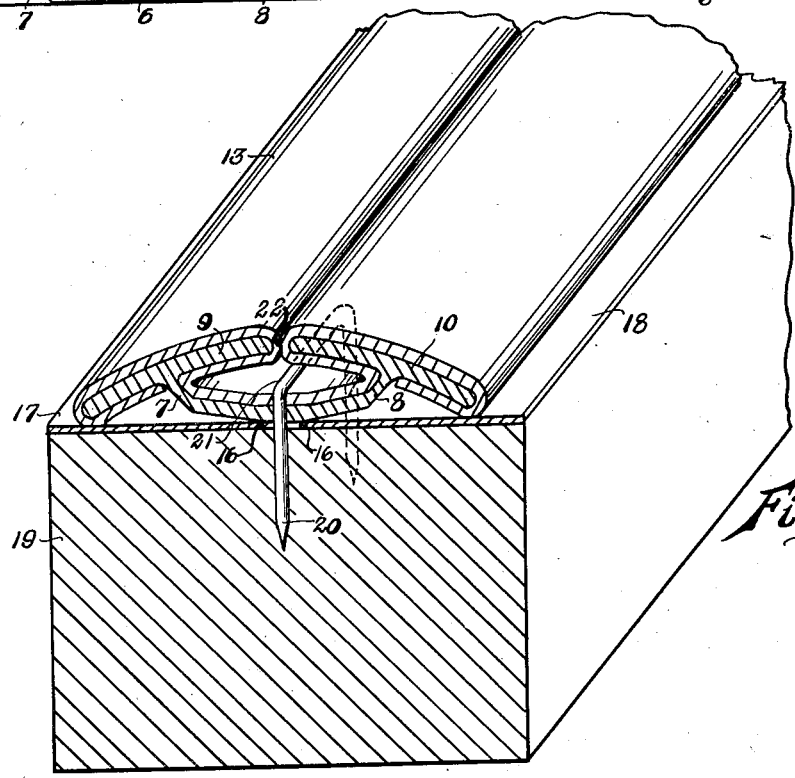
Harold B. Warren
INVENTOR

UNITED STATES PATENT OFFICE 1,972,545

FINISHING PANEL

Harold B. Warren, Cincinnati, Ohio, assignor to The Randall Company, Cincinnati, Ohio, a corporation of Ohio Application September 9, 1932, Serial No. 632,409

10 Claims. (Cl. 20—74)

This invention relates to a finishing molding.

An object of the invention is to provide such a molding formed with a base and overhanging bead members adapted to conceal the base and the attachment means.

Another object is to provide a finishing molding of this kind so constructed that upon attachment of the molding the bead members are hingedly moved into edgewise contact with one another above the base in such a manner that it is impossible to separate manually the lips of the bead members.

Another object is to produce molding of the kind described in an efficient manner and at low cost. These and other objects are attained by the means described herein and illustrated in the accompanying drawing in which:

Fig. 1 is a fragmentary perspective view of the body of the molding of this invention.

Fig. 2 is a similar view showing the covering material applied to the body and the molding itself disposed upon a surface before positive attachment thereof.

Fig. 3 is a fragmental perspective view partly in cross section, showing the molding of this invention in attached position.

The body or core of the molding is preferably formed of rubber or similar resilient material and provides the base or connector 6 having an upstanding flange 7 and 8 formed along each longitudinal edge thereof. The body is further formed to provide a pair of bead members 9 and 10 overhanging the base and with their inner edges 11 and 12 disposed in adjacency. Each of the bead members is attached along the top edge of one of the upstanding flanges 7 and 8. The outside lateral portions of the bead members project laterally beyond the base 6 and are disposed in substantially the same plane as the under face of the base 6, as illustrated in Fig. 1. Flanges 7 and 8 are comparatively weak relative to the thicker and more rigid base and bead members so that flexing occurs along these flanges rather than in the base or bead members.

The body so formed is adapted to be covered with suitable material 13 which extends over the top face of the base 6 and flanges 7 and 8 and embraces the bead members 9 and 10. It will be seen in Fig. 2 that the application of the covered material 13 to the body of the molding results in extending the outer edges of the bead members 9 and 10 below the line of the base 6. By this structure it results that when the molding is initially positioned upon a supporting surface 14, the covered outer edges of the bead members hold base 6 in spaced relationship with the supporting surface 14. It may at this point be noted that the covered bead members may have their inner longitudinal edges substantially in contact with one another.

The operative positioning of the molding is seen in Fig. 3. It is adapted to be positioned in the usual way along the adjacent edge lines 15 and 16 of the two areas of covered material such as 17 and 18 disposed on a suitable supporting member 19. The bead members 9 and 10 are adapted to be resiliently separated by a tool along their inner longitudinal edges in order to permit the insertion of a staple 20 or the like, through the base of the molding. It will be seen that the head 21 of the staple is disposed between the bead members 9 and 10 and concealed thereby. When the staple is driven down into the supporting member 19, the base of the molding is carried downwardly into contact with the supporting surface. This results in hinged movement of the bead members 9 and 10, toward one another, their outer longitudinal edges having been disposed against the supporting surface as previously described, and as illustrated in Fig. 2. This hinged movement brings the inner longitudinal edges of the bead members into firm contact with one another as illustrated at 22, whereby the molding is rendered firm and smooth in appearance and without the formation of any unsightly spaces or interstices between said inner longitudinal edges of the bead members. Moreover, as previously intimated, the lips of the bead members are not openable manually but require a spreading tool which cooperates with a pneumatic hammer device and which is progressively advanced as the attaching staples are inserted. This feature of the attached molding insures a longer life as well as an improved appearance.

It is obvious that the molding might be constructed without the covering material in which instance the bead members might be so formed that their outer longitudinal edges would occupy the relationship as shown by the covered bead members in Fig. 2.

Other modifications appear obvious upon consideration of the means described herein but these are believed to be comprised within the spirit and scope of this invention.

What is claimed is:

1. A finishing molding formed of resilient material and comprising a strip-like base having an upturned flange formed along each longitudinal edge thereof, and a pair of opposed bead members attached one each longitudinally of the edge of one of said flanges, the inner edges of the bead members being disposed in adjacency above the longitudinal center of the base and the outer edges of said members projecting laterally beyond and beneath said base, said outer edges being adapted when the molding is initially positioned to contact the attachment surface and hold said base in spaced relationship therewith, said base being adapted to have attachment means inserted therethrough upon spreading of the bead members, and the bead members being hingedly moved into firm contact with one another along their inner edges upon attachment of the base against the supporting surface.

2. A finishing molding comprising a strip-like base, and a pair of resilient bead members attached one each along one of the longitudinal edges of the base and overhanging the base, the outside lateral portions of the bead members projecting beyond the base and below the line thereof, said base being adapted to have attaching means inserted therethrough with the heads thereof disposed between the bead members, the inner longitudinal edges of the bead members being brought together into firm contact by attachment of the base against a supporting surface.

3. A finishing molding comprising a rubber body consisting of a strip-like base formed with an upstanding flange along each longitudinal edge, a bead member attached along the edge of each of said flanges and overhanging said base, the outside lateral portions of said members projecting laterally beyond the base, and covering means extending over the top surface of said base and flanges and embracing said bead members, the outer edges of the bead members in covered condition extending below the line of the base, said base being adapted to have attaching means inserted therethrough with the heads thereof disposed between the bead members, and the latter upon attachment of the base against a supporting surface being hingedly moved toward one another for bringing their inner longitudinal edges into firm contact.

4. A finishing molding comprising a base, a pair of bead members overhanging the base and hingedly mounted one each along a longitudinal edge thereof, and means integral with the molding for hingedly moving the bead members toward one another upon attachment of the base against a supporting surface.

5. A finishing molding formed of resilient material and comprising a strip-like base, and a pair of bead members overhanging the base in spaced relationship therewith and attached one each along the longitudinal edges thereof, said bead members being formed with their inner longitudinal edges disposed immediately adjacent one another and with their outer longitudinal edges projecting beyond the lateral portions of said base and below the line thereof, said outer edges, when the molding is initially disposed against a surface, being adapted to hold said base out of surface contact and, when the base is fastened down against the surface, being adapted to effect hinged movement of the bead members into firm manually unopenable relationship with one another along their inner longitudinal edges.

6. A finishing molding formed of resilient material and comprising a base adapted to be fastened down against a surface, means overhanging and concealing the base and hingedly connected therewith, said means being resiliently movable to permit insertion of attaching means through the base, and means operative upon fastening down of the base for precluding manual movement of said hingedly connected means.

7. A finishing molding core comprising a pair of elongated bead members and a connector continuous with the bead members and attached to the bead members intermediate the lateral edges of the bead members, the bead members when disposed upon a flat surface converging toward one another along their upper edges and the lower face of the connector being substantially aligned with the lower edges of the beads, the bead members and central part of the connector being relatively stiffer or more rigid than the ends of the connector at the place of joinder thereof to the beads.

8. A rubber finishing molding comprising a base, a pair of bead members overhanging the base and attached one each along a longitudinal edge thereof, the joinder portions of the bead members with the base being relatively weak whereby the bead members are readily flexed relative to the base and means hingedly moving the bead members toward one another upon attachment of the base against a supporting surface.

9. A finishing molding formed of resilient material and comprising a strip-like base having an upturned flange formed along each longitudinal edge thereof, and a pair of opposed bead members attached one each longitudinally of the edge of one of said flanges, the flanges being of relatively less thickness than the base and bead members whereby said members are readily flexible relative to the base, the inner edges of the bead members being disposed in adjacency above the longitudinal center of the base and the outer edges of said members projecting laterally beyond and beneath said base, said outer edges being adapted when the molding is initially positioned to contact the attachment surface and hold said base in spaced relationship therewith, said base being adapted to have attachment means inserted therethrough upon spreading of the bead members, and the bead members being hingedly moved into firm contact with one another along their inner edges upon attachment of the base against the supporting surface.

10. A finishing molding core comprising a pair of elongated bead members, and an elongated connector integral with the bead members and having each longitudinal edge attached along the under face of one of said members intermediate the lateral edges of said members, the bead members, when the molding core is disposed on a flat surface, converging toward one another along their adjacent edges and the lower face of the connector being substantially aligned with the outermost edges of the bead members, the joinder portions of the connector and bead members being relatively weaker than said connector and bead members to permit flexing along said joinder portions.

HAROLD B. WARREN.